(12) United States Patent
Goessel et al.

(10) Patent No.: US 7,870,473 B2
(45) Date of Patent: Jan. 11, 2011

(54) ERROR DETECTION DEVICE FOR AN ADDRESS DECODER, AND DEVICE FOR ERROR DETECTION FOR AN ADDRESS DECODER

(75) Inventors: Michael Goessel, Mahlow (DE); Franz Klug, Munich (DE); Jorge Guajardo Merchan, Aalst-Waalre (NL); Steffen Marc Sonnekalb, Taufkirchen (DE)

(73) Assignee: Infineon Technologies AG (DE)

( * ) Notice: Subject to any disclaimer, the term of this patent is extended or adjusted under 35 U.S.C. 154(b) by 929 days.

(21) Appl. No.: 11/672,638

(22) Filed: Feb. 8, 2007

(65) Prior Publication Data
US 2007/0277085 A1 Nov. 29, 2007

(30) Foreign Application Priority Data
Feb. 8, 2006 (DE) .................. 10 2006 005 817

(51) Int. Cl.
G06F 7/02 (2006.01)
H03M 13/00 (2006.01)
(52) U.S. Cl. .......................... 714/819
(58) Field of Classification Search .......... 714/746, 714/799, 819
See application file for complete search history.

(56) References Cited

U.S. PATENT DOCUMENTS

| | | | |
|---|---|---|---|
| 4,920,538 A | 4/1990 | Chan et al. | |
| 5,278,848 A * | 1/1994 | Yamaguchi | 714/800 |
| 5,784,393 A * | 7/1998 | Byers et al. | 714/800 |
| 5,838,896 A | 11/1998 | Han | |
| 6,128,755 A | 10/2000 | Bello et al. | |
| 6,247,118 B1 | 6/2001 | Zumkehr et al. | |
| 6,543,028 B1 | 4/2003 | Jamil et al. | |
| 6,785,842 B2 | 8/2004 | Zumkehr et al. | |
| 7,543,221 B2 | 6/2009 | Mukherjee et al. | |
| 2005/0108509 A1 | 5/2005 | Safford et al. | |

FOREIGN PATENT DOCUMENTS

DE 103 60 196 A1 7/2005

OTHER PUBLICATIONS

Ray, J et al.; "Dual Use of Superscalar Datapath for Transient-Fault Detection and Recovery"; Proceedings of the 34th annual ACM/IEEE International Symposium on Microarchitecture, Austin, Texas, 2001, pp. 214-224.

* cited by examiner

Primary Examiner—Shelly A Chase
(74) Attorney, Agent, or Firm—Dickstein Shapiro LLP

(57) ABSTRACT

An error detection device for an address decoder converting an input address to an associated output address out of a plurality of valid output addresses using a 1-out-of-n decoder, the error detection device including a regenerator for generating a regenerated address on the basis of the output address from the 1-out-of-n decoder, and a comparer for receiving the input address and the regenerated address and to output a signal, on the basis of a comparison of the input address and the regenerated address, which indicates an error in the conversion of the input address to the output address if the input address and the regenerated address do not match, and which indicates an error-free conversion of the input address to the output address if the input address equals the regenerated address.

17 Claims, 3 Drawing Sheets

| number of address positions | P | 7 | 15 | 31 | 63 | 127 | 255 |
|---|---|---|---|---|---|---|---|
| number of regenerated address positions | m | 3 | 4 | 5 | 6 | 7 | 8 |

ERROR DETECTION DEVICE FOR AN ADDRESS DECODER, AND DEVICE FOR ERROR DETECTION FOR AN ADDRESS DECODER

CROSS-REFERENCE TO RELATED APPLICATION

This application claims priority from German Patent Application No. 102006005817.8, which was filed on Feb. 8, 2006, and is incorporated herein by reference in its entirety.

BACKGROUND

The present invention relates to instruction decoders as are employed, for example, in microprocessors.

An instruction decoder encodes instructions into control signals and parameters for a data path. The coding depends on the status signals. The status signals depend on the state of the computer, particularly on register contents, on memory contents and on the executed instruction in each case.

In general, an instruction has the form "op, [address 1], . . . , [address k], [parameter]". The expressions between square brackets [ ] may or may not occur, i.e. they are optional. In the following example, k=2. "op" refers to the operation to be carried out. Examples are "add", "XOR", "jump". The addresses [address 1], . . . , [address 1] are register addresses of the register file, also referred to as register field.

In the instruction "add, address 1, address 2, address 3", the data stored in the registers at the addresses "address 1" and "address 2" are added and written into the register with the address "address 3". There is no parameter in this instruction.

The instruction decoder is responsible for transforming the instruction to a sequence of control words. In a sequence of control words associated with an instruction by the decoder, a sequence of control signals for the data path and corresponding parameters are determined so that the instruction present at the instruction decoder is executed in the computer.

In general, the sequence of control words associated with an instruction does not only depend on the instruction, but, as mentioned, also on the state of the computer and, in certain rare cases, also on the parameters of the instruction. The state of the computer affects the sequence of control signals by the status signals of the computer.

More specifically, various sequences of control signals are associated with an instruction, wherein the sequence of control signals that is actually to be used is selected by the status signals and also by the values of the parameters.

If, for example, the parameters are an address in the external memory, the value of a particular bit of this address may decide, for example, which external memory is accessed. For an instruction, the number of control words in the various sequences of control words is generally different.

To explain this in more detail, it will be assumed in the following that, in the considered processor, one sequence of control words, two different sequences of control words or three different sequences of control words are associated with an instruction.

A generalization to more than three different sequences of control words is possible.

If two different sequences of control words are associated with an instruction, they start with some common control signal words and branch depending on the values of certain status symbols or certain parameter values.

As an example, consider the instruction "if Reg(address 1)≦i goto address 2" (corresponding to a JLE address 1, i, address 2). The instruction contains the address "address 1" and the parameter "i, address 2", which is given here by an integer value i and an address "address 2". The operation code, which is also abbreviated as opcode, is "if Reg( )≦( ) goto( )".

First, the contents of the register with the address "address 1" are compared to the value i. For this purpose, the contents of the register with the address "address 1" in the register field are read, the read value is subtracted from the, for example, sign-extended parameter i in the arithmetic logic unit, abbreviated ALU. After the subtraction, the instruction branches. Depending on the value, 0 or 1, of the sign bit of the ALU, the process proceeds with the next instruction or the instruction with the relative address "address 2".

The considered instruction is thus associated with two different control sequences which branch after a common initial sequence. The status signal selecting and/or determining a control sequence from the two possible control sequences at the branch point is here the sign bit of the ALU.

In the command "addi Reg(address 1), Reg(address 2), K", "address 1" and "address 2" are addresses of registers of the register field, and the parameter "K" is an integer number and/or an integer natural number which is added to the value stored in register 1. The sum is stored in the register of the register field with the address "address 2". Only one control sequence is associated with this command.

If three different sequences of control words are associated with an instruction, these three sequences start with some common control words, they branch into two branches depending on the values of certain status symbols and/or status signals or certain parameter words, and one of the two branches then branches a second time depending on further status signals or parameter values.

The structure of the instruction decoder may be described as follows and/or the following three tasks may be associated with the instruction decoder: 1. determining sequences of control signal words for the data path; 2. determining sequences of control signal words for a control logic for applying the parameters of the instructions for modification to the ALU or a special sign extension unit. Such operations are, for example, sign extensions, inversion of all bits, inversion of selected bits of the parameters of the instructions. These operations may be performed in the ALU in most cases and, if any, partially in a special sign extension unit; 3. determining 1-out-of-n control signals for the register field from the binary addresses for the corresponding registers.

The first two tasks are combined in the following to form one task "determining sequences of control signals for data path and control logic". Correspondingly, the instruction decoder may be structurally made of the two following units: 1. module for determining control signal sequences for the data path and for the control logic; 2. address decoder for the register field.

In the following, the module for determining the sequences of control signals is described in more detail. For this purpose, first consider the case that two sequences of control words are associated with an instruction, wherein the current sequence of control words is selected by a function of the status signals or parameters. A control word $W^i$ consists of a control signal word $S^i = s_1^i, \ldots, s_{ni}^i$ and a parameter word $P^i = p_1^i, \ldots, p_{mi}^i$.

The components $s_1^i, \ldots, s_{ni}^i$ of the control signal word $S^i$ do not depend on the parameters of the instruction, but only on the operation code (opcode) and on the status signals or the parameter values of the instruction via the selection of the sequence of control signal words. The components $p_1^i, \ldots,$ $p_{mi}^i$ of the parameter word $P^i$ are determined by the parameters of the instruction. They also depend on the status signals.

The module for determining the control sequences determines the associated sequence of control signal words for a considered instruction depending on the status signals or the parameter values.

In the following, now consider, by way of example, an instruction "instruction" with which the following two sequences of control signal words are associated:
1. $S^1, S_2, \ldots, S^i; S^{i+1}, \ldots, S^n$
2. $S^1, S^2, \ldots, S^i; S^{i+1}; \ldots, S^m$ As a specific example, consider the two sequences
1. $S^1, S^2; S^3, S^4$
2. $S^1, S^2; S^{3'}, S^{4'}, S^{5'}$ in the following, which are associated with the instruction "instruction".

The first i, in the example i=2, control signal words $S^1$, $S^2$ are equal in both sequences. The first or the second sequence is selected depending on the values of certain status signals. Such an association may be realized with a read-only memory, abbreviated ROM, and a counter.

The control signal words $S^1, S^2, \ldots, S^i$ are deposited at the consecutive addresses $A+1, A+2, \ldots, A+i$ and/or $A_1, A_2, \ldots, A_i$, a mask of the status signals to be evaluated is deposited, for example, at the address $A+i+1$ and/or $A_{i+1}$, a vector of status signals $\sigma_1, \ldots, \sigma_k$ is deposited at the address $A+i+2$ and/or $A_{i+2}$, so that the status signals causing the branching assume the value necessitated for the branching. The control signal word $S^{i+1}$, $S^3$ in the example, is deposited at the address $A+i+4$ and/or $A_{i+4}$. The jump address and/or address $A(S^{i+1})$ for the control signal word $S^{i+1}, \ldots, S^3$, in the example, is deposited at the address $A+i+3$ and/or $A_{i+3}$, and the control signal words $S^{i+1}, \ldots, S^n$, are deposited at the following addresses.

The control signal words $S^{i+1}, S^{i+2}, \ldots, S^n$ are stored at the addresses $A(S^{i+1})$, $A(S^{i+1})+1 \ldots, A(S^{i+1})+n-1$. If the comparison of the actually present status symbols with the stored status symbols shows a match, the counter is correspondingly incremented to the value $A+i+4$ and/or $A_{i+4}$ If the comparison of the actually present status symbols with the stored status symbols does not show a match, the address $A(S^{i+1})$ stored at the address $A+i+3$ and/or $A_{i+3}$ is loaded into the counter, which now successively outputs the sequence of control signal words $S^i, S^{i+1}, \ldots, S^n$. The described implementation serves only as an example, other possibilities for implementation are also possible.

For the considered example with i=2, n=4 and n'=5, the result in the ROM is

| | |
|---|---|
| $A_1$ | $S^1$ |
| $A_2$ | $S^2$ |
| $A_3$ | mask status symbols = 1, 0, 1, 1, 0 |
| $A_4$ | values status symbols = 1, —, 0, 1, — |
| $A_5$ | jump address $A_8$ |
| $A_6$ | $S^3$ |
| $A_7$ | $S^4$ |
| $A_8$ | $S^{3'}$ |
| $A_9$ | $S^{4'}$ |
| $A_{10}$ | $S^{5'}$ |

The control signal words $S^1$ and $S^2$ are stored at the addresses $A_1$, $A_2$. They are common to both sequences. The mask of the status symbols relevant for the decision is given at the address $A_3$. The mask is arbitrarily assumed to be 1,0,1,1,0 in this example. Based on this mask, there is then made a decision based on the first, third and fourth status symbols which one of the two control signal sequences is to be generated. The mask at the first, third and fourth positions therefore has the value 1. The positions with the mask value 0, here the position 2 and 5, are not taken into account in the selection.

The actual values of the status symbols are given at the following address $A_4$, whose matching with the current status symbols decides about the continuation of the instructions.

For the considered example, 1, 0 and 1 have again been entered arbitrarily at the first, third and fourth positions.

The following is to apply to the current status symbols of the ALU in this example: If the first status symbol assumes the value 1, the third one assumes the value 0 and the fourth status symbol assumes the value 1, the address $A_4$ is incremented by two to $A_6$, and the control signal sequence is continued with $S^3$, $S^4$, which are deposited at the addresses $A_6$, $A_7$.

If it is not the case that the first status symbol is 1 and the third status symbol is 0 and the fourth status symbol is 1, the address $A_4$ is incremented by 1 to $A_5$. The jump address $A(S^{3'})=A_8$ is at this address.

The control signal sequences $S^{3'}$, $S^{4'}$ and $S^{5'}$ are stored at the addresses $A_8$, $A_9$, $A_{10}$, and the control signal sequence is continued with $S^{3'}$, $S^{4'}$, $S^{5'}$.

If a further division of a control signal sequence depending on status symbols is necessitated, there may analogously be provided three further addresses with a mask of the relevant status symbols, with the actual values of the relevant status symbols and a jump address in the ROM.

If the continuation of a control signal sequence depends on parameter values, a mask for the parameter values may be used instead of the mask for status symbols, and the values of the parameters may be used instead of the values of the status symbols.

A bit in the mask may decide which type of mask, i.e. mask for status symbols or mask for parameters, it is.

By using the described masks and comparison bits, the status variables and the parameters may be avoided as input variables of the ROM, and the ROM with a small address width remains relatively small.

The time for processing an instruction, however, increases with each branch by an average of two and a half cycles.

The following will briefly discuss the task of the address decoder for the register field. If addresses for registers of the register field appear in a control word, they are to be coded into a 1-out-of-n bit code word by an address decoder. The associated hardware is a normal 1-out-of-n coder.

The parameters of an instruction are often used unmodified, sign-extended, negated or negated in special bits in a control word. These modifications are done depending on the respective instruction, on the specific parameter of the instruction and on status signals. Most of these operations may be performed in the ALU, for which the instruction decoder provides the control signals. The operations "sign extension" and "padding with zeros" are performed depending on the specific processor in the ALU or in a special combinatorial circuit, for example in a sign extension unit. When modifying the parameters, the task of the instruction decoder is to apply the parameters of the instructions to the ALU or to the sign extension unit at the right time, to provide the control signals and, if necessary, masks for the ALU or the sign extension unit and to provide the control signals and addresses for storing the result in the register field.

When contemplating a typical example of a command of a command set, e.g. "Mov Rj, Rk" as an example of an Mov instruction from the Intel 80251 command set, wherein the content of register Rj is moved to register Rk, it becomes obvious that, in this case, addresses are very often used. The addresses generated in the example given point to a register field which is typically a few 100 bytes in size. Thus, the address itself is a few bits wide, e.g. 6 bits for a typical implementation of an Intel 80251 processor. These addresses may now be applied, as "one-hot"-encoded addresses and/or 1-out-of-n encoded addresses, to a memory field. The memory field may be implemented, for example, as a random access memory (RAM) or a flip-flop-based register field, also referred to as a latch-based register file. The possibility of generating a faulty result due to an interference in these addresses is high, since even one single faulty bit within the address, for example, may cause a wrong register to be addressed. This may then cause, for example, a wrong value or a wrong mask to be used for a following operation, or may cause, when writing back a result of an operation, the result to be written to a wrong address, at which it is no longer possible to fall back on the result in a subsequent processing step.

BRIEF DESCRIPTION OF THE DRAWINGS

Preferred embodiments of the present invention will be explained below in more detail with reference to the accompanying figures, wherein.

DESCRIPTION OF THE INVENTION

Figure 1:
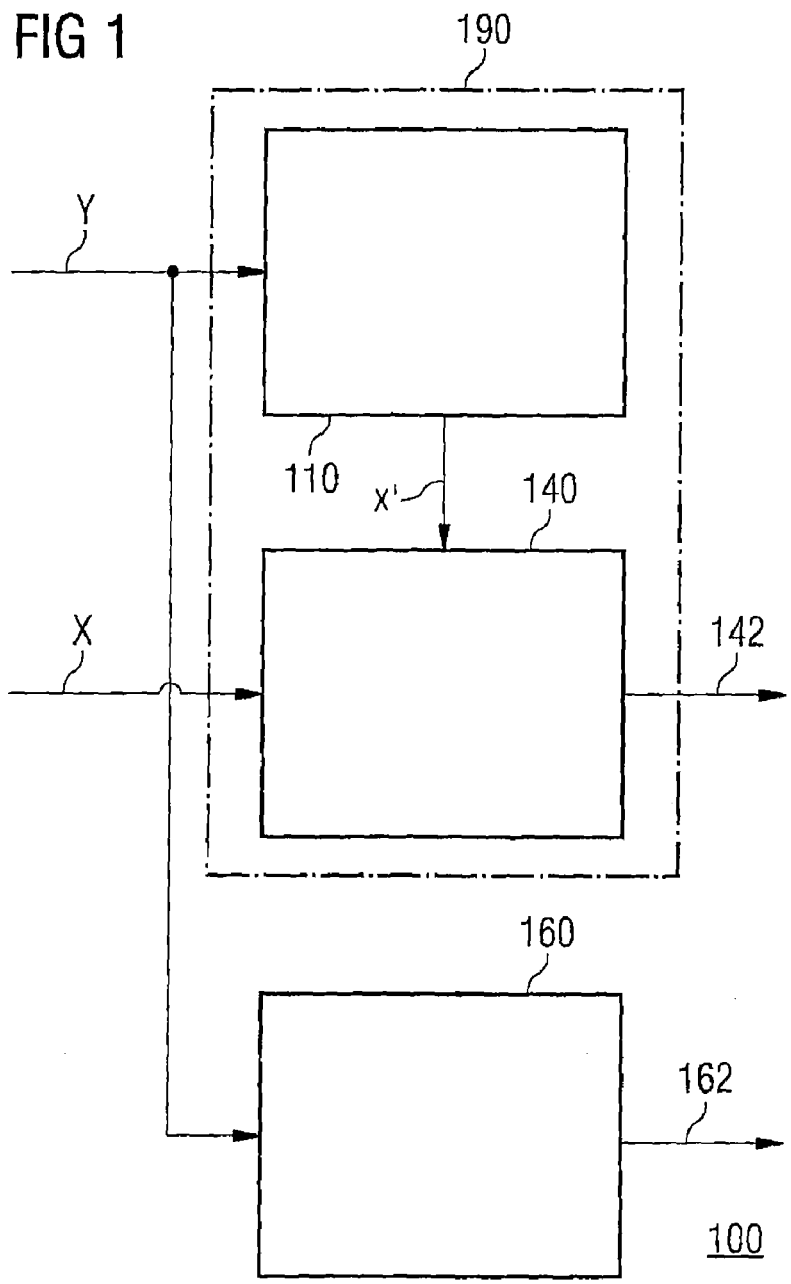
FIG. 1 shows a preferred embodiment of an error detection device comprising a regeneration device, a comparison device, and a signal generation device.

The present invention to provides a device and a method for protection against address errors for an address decoder.

Generally, there are three different possibilities of detecting errors within the instruction decoder: 1) protecting the individual modules: a) for the module for determining the control signal sequences by means of a two-port ROM or, also, by means of a signature, and b) for the module address decoders for the register field by means of a 1-out-of-n coding check and by means of a regeneration of the input address, or inputs, 2), protecting the entire instruction decoder by means of signature formation, and 3), protection of the entire instruction decoder essentially only by means of photosensitive elements and simple codes.

The present invention relates to possibility 1)b). The possibilities 1)a and 2) are described in the parallel application "Error detection device and method of error detection for a command decoder" which has been filed along with the present application.

The present invention provides an error detection device for an address decoder converting an input address to an associated output address out of a number of valid output addresses using a 1-out-of-n decoder, the error detection device comprising: a regeneration device for generating a regenerated address on the basis of the output address from the 1-out-of-n decoder, the regenerated address equaling the input address if the conversion of the input address to the associated output address occurs without any faults, and the regenerated address not equaling the input address if the conversion of the input address generates an output address, out of the plurality of valid output addresses, which does not equal the associated output address; a comparison device for receiving the input address and the regenerated address and for outputting a signal, on the basis of a comparison of the input address and the regenerated address, which indicates an error in the conversion of the input address to the output address if the input address and the regenerated address do not match, and which indicates an error-free conversion of the input address to the output address if the input address equals the regenerated address.

The invention further provides an error detection device for an address decoder converting an input address to an associated output address out of a number of valid output addresses using a 1-out-of-n decoder, the error detection device comprising: a signal generation device for outputting, on the basis of the output address from the 1-out-of-n decoder, a signal which indicates an error in the conversion of the input address to the output address if the conversion of the input address generates an output address which does not originate from the number of valid output addresses, and indicates an error-free conversion of the input address to the output address if the conversion of the input address generates an output address from the number of valid addresses.

The present invention further also provides an error detection device for an address decoder, the error detection device comprising the features of both above-mentioned embodiments of the error detection device.

In addition, the invention provides an address decoder for converting an input address to an associated output address from a number of valid output addresses using a 1-out-of-n decoder, with an error detection device.

The invention further provides a method for error detection for an address decoder converting an input address to an associated output address out of a number of valid output addresses using a 1-out-of-n decoder, the method for error detection comprising: generating a regenerated address on the basis of the output address from the 1-out-of-n decoder, the regenerated address equaling the input address if the conversion of the input address to the associated output address occurs without any faults, and the regenerated address not equaling the input address if the conversion of the input address generates an output address, out of the plurality of valid output addresses, which does not equal the associated output address; receiving the input address and the regenerated address; and comparing the input address and the regenerated address to output a signal, on the basis of a comparison of the input address and the regenerated address, which indicates an error in the conversion of the input address to the output address if the input address and the regenerated address do not match, and which indicates an error-free conversion of the input address to the output address if the input address equals the regenerated address.

The invention further provides a method for error detection for an address decoder converting an input address to an associated output address out of a number of valid output addresses using a 1-out-of-n decoder, the method for error detection comprising: generating a signal, on the basis of the output address from the 1-out-of-n decoder, which indicates an error in the conversion of the input address to the output address if the conversion of the input address generates an output address which does not originate from the number of valid output addresses, and indicates an error-free conversion of the input address to the output address if the conversion of the input address generates an output address from the number of valid addresses.

The invention also provides a method for error detection for an address decoder, comprising the steps of the two above-mentioned methods.

In one embodiment, the regeneration device comprises a plurality of stages of XOR gates, each output of the XOR gates of the last stage being associated with a regenerated address position, or position within an address, and the inputs of the XOR gates receiving different combinations of output address positions, respectively.

In a further embodiment, the signal generation device comprises a plurality of stages of half adders, the AND outputs of the half adders being applied to an OR gate, and the XOR outputs of the half adders being applied to the inputs of the half adders of a next stage, and the XOR output of the half adder of the last stage being applied to the OR gate in an inverted manner.

A preferred embodiment comprises a regeneration device, a comparison device and a signal generation device, and thus detects all errors, provided that the error detection device itself operates correctly.

The advantage of the inventive error detection device for an address decoder is to detect errors in the address decoding of a 1-out-of-n decoder, and thus to increase the reliability of the address decoding and/or instruction decoding.

FIG. 1 shows an error detection device 100 for a 1-out-of-n address decoder comprising a regeneration device 110, a comparison device 140, and a signal generation device 160. Regeneration device 110 is configured to receive the output address Y generated by the 1-out-of-n decoder on the basis of an input address X. The 1-out-of-n decoder is not shown in FIG. 1. On the basis of output address Y, regeneration device 110 generates a regenerated address X', the regenerated address X' equaling the input address X if the conversion of input address X to associated output address Y is performed without errors, and the regenerated address X' not equaling input address X if the conversion of input address X generates an output address Y, of the number of valid output addresses Y, which is not equal to the associated output address Y.

Comparison device 140 is configured to receive input address X of the 1-out-of-n decoder, and the regenerated address X' of regeneration device 110, and to output, on the basis of a comparison between input address X and regenerated address X', a signal 142 which indicates an error in the conversion of input address X to output address Y if input address X and regenerated address X' do not match, and which indicates an error-free conversion of input address X to output address Y if input address X equals regenerated address X'.

In other words, regeneration device 110 and comparison device 140 form a first error detection device 190 which allows detecting those errors wherein the output address is a valid, but an incorrect valid output address, i.e. a valid output address which is not associated with input address X in accordance with an error-free 1-out-of-n decoding.

Signal generation device 160 is configured to receive output address Y and to output a signal 162 which indicates an error in the conversion of input address X to output address Y if the conversion of input address X generates an output address Y which does not originate from the number of valid output addresses Y, and which indicates an error-free conversion of input address X to output address Y if the conversion of the input address generates an output address from the number of valid addresses Y. In other words, signal generation device 160 forms a second error detection device 160 configured to detect those errors in the 1-out-of-n decoding wherein the output address Y is not a valid output address.

A preferred embodiment of an error detection device 100 therefore comprises both the first error detection device 190 and the second error detection device 160, and therefore detects all errors.

First error detection device 190 and second error detection device 160, however, may also be employed individually, and even individually they offer an advantage.

The error detection device for an address decoder may therefore comprise both first error detection device 190 on its own, second error detection device 160 on its own, as well as a combination of first error detection device 190 and second error detection device 160, and may accordingly generate an error signal 142 on its own, an error signal 162 on its own, or both error signals 142, 162, or a signal combined from error signals 142, 162.

If an error is detected by error detection device 100, address decoding may be repeated, for example, or, in the event of an unambiguous error localization, an error correction may possibly be performed.

Generally speaking, there are various possibilities of detecting errors in instruction decoders: 1) protection or error detection within the individual modules, i.e. within the module for determining control signal sequences for the data path and for the control logic, or within the address decoder for the register field; or 2) protection of the entire instruction decoder.

The error detection explained in detail above and below is performed individually for the units of the instruction decoder and/or individually for the address decoder and the module for determining control signal sequences for the data path and for the control logic. The error detection for the address decoder may be ensured, and/or the outputs and/or output addresses of the address decoder may be protected, in that the addresses to be input into the address decoder, i.e. the input address, are tapped prior to being checked for the cache, and the addresses for comparison with the regenerated addresses are tapped after the check for the cache, if the interface between the cache/register file and the instruction decoder allows this.

The 1-out-of-n decoder transforms its m bits wide addresses $x=x_1, \ldots, x_m$ to 1-out-of-n code words $y=y_0, y_1, \ldots, y_n$. Here, $n=2^m$.

The following errors may arise from this: 1) instead of outputting a 1-out-of-n code word, the faulty decoder outputs a non-code word. It either contains only zeros, or it contains at least two ones; 2) instead of outputting a desired 1-out-of-n code word, the decoder outputs a different, incorrect 1-out-of-n code word; 3) the input of the decoder is faulty.

Further errors of the decoder do not exist.

In the following, what will be looked at is only the detection of errors of the address decoder itself, i.e. of non-code words and of incorrect code words at the output of the decoder.

A preferred embodiment of error detection for these errors is based on two error detection circuits which may be jointly implemented. The first error detection circuit comprises the regeneration of the input symbols and/or input addresses of the decoder by m parity trees which realize links of an (m,n)-H matrix and a Hamming code. This first error detection circuit corresponds to regeneration device 110 of the first error detection device of FIG. 1. The second error detection circuit includes a tree of half adder cells, the half adder cells comprising two inputs a and b, and two outputs s and c, wherein $s = a \oplus b$ and $c = a \hat{\ } b$. They are realized by an XOR gate and an AND gate, for example. The AND gate may be replaced by a NAND gate.

In the error-free case, the input symbols and/or input addresses of the decoder are regenerated at the outputs of the parity trees realizing the H matrix of a Hamming code. They may either be directly compared to the inputs, or input addresses, present or, if the inputs, or input addresses, of the decoder are protected by a code, they may be checked by a code checker. Checking of the regenerated input symbols, or input addresses, will be contemplated below.

Regenerating the input symbols, or input addresses, causes precisely those error to be detected which lead to an error syndrome not equaling zero of the Hamming code, the error syndrome corresponding to signal 142 in FIG. 1. In particular, these are also those errors which corrupt a correct, or admissible, code word of the 1-out-of-n code into an incorrect, or an admissible incorrect code word of the 1-out-of-n code. They are bi-directional 2-bits errors which corrupt a correct 1-out-of-n code word belonging to an input address present into a faulty 1-out-of-n code word belonging to a different input address which is not present. The output address Y of FIG. 1 represents a code word of a 1-out-of-n code for address coding.

Using the tree of half adder cells, all non-code words and/or inadmissible output addresses of the 1-out-of-n code, for example, are detected as faulty. This corresponds to the second error detection device and/or signal generation device 160 in FIG. 1.

Figure 3:
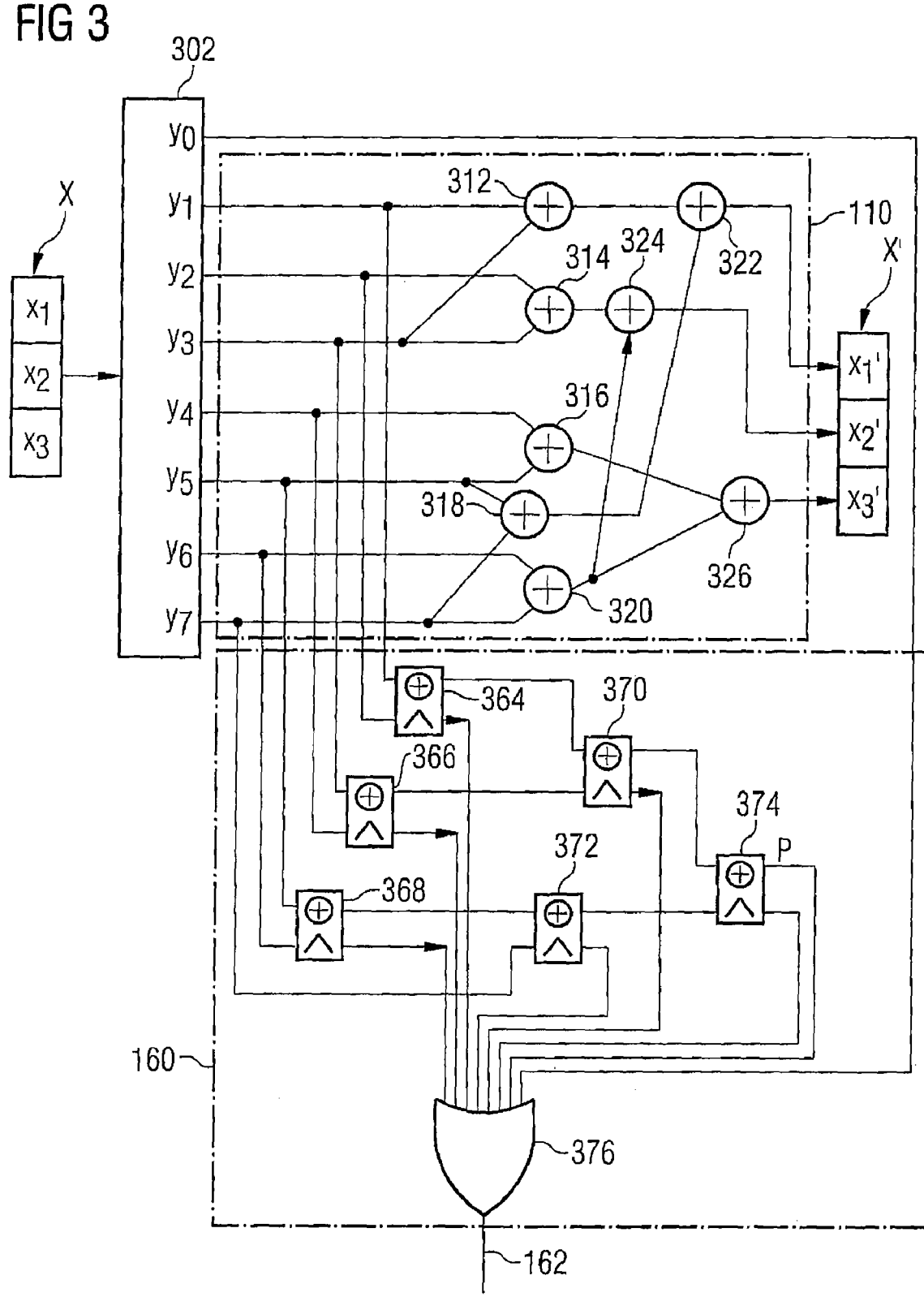
FIG. 3 shows an embodiment of an error detection device, comprising a regeneration device, a comparison device and a signal generation device, for an address decoder having a three-position input address.

FIG. 3 shows a section of a preferred embodiment of an error detection device comprising the regeneration device 110 of the first error detection device, and the/of the signal generation device 160 and the second error detection device 160, and a 1-out-of-n address decoder 302. FIG. 3 shows an embodiment of a three-position input address and an eight-position output address of address decoder 302; accordingly, the input, or input address, $X = x_1, x_2, x_3$ is present at address decoder 302, said input address $X = x_1, x_2, x_3$ converting the address decoder 302 to an output, or an output address, $Y = y_0, y_1, \ldots, y_7$, i.e. m=3 and $n = 2^3 = 8$.

Regeneration device 110 includes five XOR gates 312, 314, 316, 318, 320 of a first stage, and three XOR gates 322, 324, 326 of a second stage, each of the gates of the first stage receiving two output address positions, the combination of the two output address positions per XOR gate of the first stage being different, and each of the XOR gates of the second stage comprising two inputs connected to the outputs of two XOR gates of the first stage, the combination of the outputs of the XOR gates of the first stage being different for each XOR gate of the second stage. The outputs of the XOR gates of the second stage have one regenerated address position associated with them, respectively. Thus, output address positions $y_1, y_3$ are present at XOR gate 312, output address positions $y_2, y_3$ are present at XOR gate 314, output address positions $y_4, y_5$ are present at XOR gate 316, output address positions $y_5, y_6$ are present at XOR gate 318, and output address positions $y_6, y_7$ are applied to XOR gate 320. The output signals of XOR gates 312 and 318 are present at XOR gate 322, the output signals of XOR gates 314 and 320 are present at XOR gate 324, and the output signals of XOR gates 316 and 320 of the first stage are present at XOR gate 326. The output signal of XOR gate 322 of the second stage is associated with the regenerated address position $x_1'$, the output of XOR gate 324 is associated with the second stage of the regenerated address position $x_2'$, and the output of XOR gate 326 of the second stage is associated with the regenerated address position $x_3'$.

In other words, XOR gates 312, 318 and 322 form a parity tree for regenerated address position $x_1'$, XOR gates 314, 320 and 324 form a parity tree for regenerated address position $x_2'$, and XOR gates 316, 320 and 326 form a parity tree for regenerated address position $x_3'$.

Comparison device 140, not depicted in FIG. 3, may be realized, for example, by XORing $x_1$ with $x_1'$, $x_2$ with $x_2'$, and $x_3$ with $x_3'$ in a localized manner. For example, the results of the three XOR operations may be individually applied to OR gate 376, or be combined, by an additional OR gate, into signal 142 of FIG. 1 and then be applied, thus aggregated, to OR gate 376, for example.

Signal generation device 160 in FIG. 3 comprises three half adders 364, 366 and 368 of a first stage, two half adders 370 and 372 of a second stage, and a half adder 374 of a third, or last, stage. Each half adder of the first stage has two output address positions present thereat, the two output address positions, respectively, being applied to no other half adder of the first stage. The XOR outputs, or, in accordance with FIG. 2, the outputs for signal s, of two half adders of the first stage are present at the inputs of the half adders of the second stage, the two XOR output signals, respectively, being applied to no other half adder of the second stage. Depending on the number of output address positions, an output address position, e.g. the most significant address position, or the most significant bit (MSB), may be directly present at one of the half adders of the second stage, as is shown in FIG. 3 for output address position $y_7$ and half adder 372 of the second stage.

The XOR outputs of half adders 370, 372 of the second stage are present at half adder 374 of the third, and last, stage. Thus, output address positions $y_1, y_2$ are present at half adder 364, output address positions $y_3, y_4$ are applied to half adder 366, output address positions $y_5, y_6$ are applied to half adder 368. The XOR output signals of half adders 364 and 366 are present at half adder 370, and the XOR output signal of half adder 368, and output address position $y_7$ are applied to half adder 372.

The AND outputs of each half adder 364, 366, 368, 370, 372, 374 are present at an OR gate 376. Every output address Y which comprises more than, for example, a FIG. 1 and/or more than one position with a first logic level 1 is detected as incorrect by the AND output signals of the half adders.

The XOR output signal P of half adder 374 of the third, and last, stage is supplied to the OR gate in an inverted manner.

The XOR output signal of half adder 374 is the overall parity of output address positions $y_1$ to $y_7$ and allows detecting whether the output address and/or the output address positions $y_1$ to $y_7$ all have the value of 0 and/or the second logic level 0. In this case, P=0 and, due to the inversion, signal 162, which indicates an error and/or has the value of 1 if the overall parity is P=0, results at the output of the OR gate.

In addition, the output address position $y_0$, i.e. the least significant address position and/or the least significant bit (LSB), is supplied directly to the OR gate 376, and an error is indicated, i.e. signal 162 has the value of 1 if $y_0 = 1$.

In the following, the term output $y_1, \ldots, y_7$ will also be used for the term of output address position $y_1, \ldots, y_7$, and the term input $x_1, x_2, x_3$ will also be used for input address position $x_1, x_2, x_3$.

The m=3 trees, which regenerate inputs $x_1, x_2, x_3$ at their outputs $x_1', x_2', x_3'$ in accordance with the H matrix of the Hamming code, are jointly realized. They share several XOR gates 318 and 320.

The tree of half adder cells 364, 366, 368, 370, 372, 374 is realized, in FIG. 3, separately from the three parity trees of regeneration device 110. This separate realization in FIG. 3 occurs so as to be able to better explain error detection and to be able to better explain the two components and/or embodiments which are independent of one another.

Figures 4, 5:
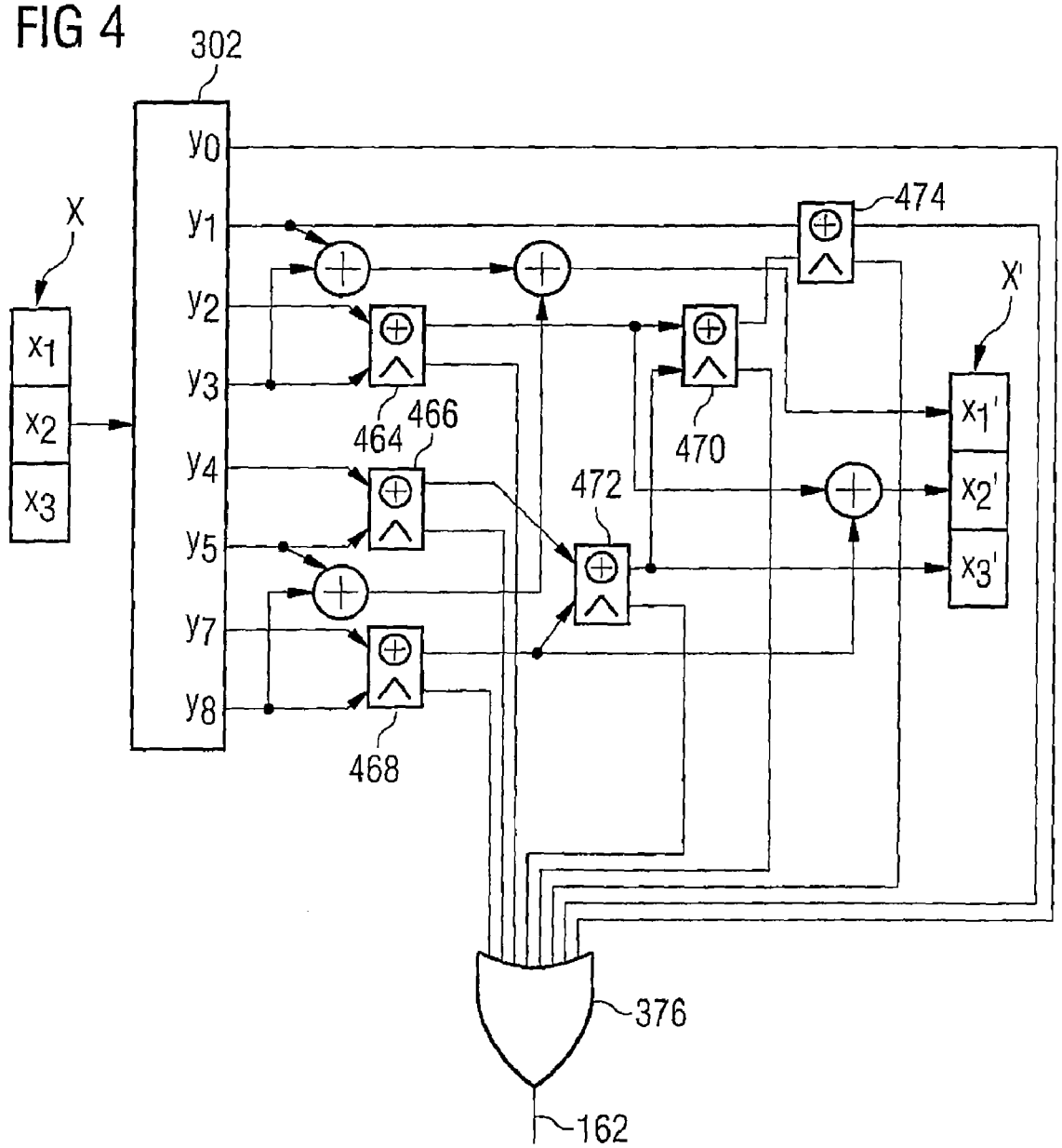
FIG. 4 shows a preferred embodiment of an error detection device comprising a regeneration device, a comparison device, and a signal generation device, for an address decoder having a three-position input address.
FIG. 5 shows a table of the maximum number of output address positions of a 1-out-of-n address decoder as a function of the number of regenerated address positions of the error detection device and/or as a function of the number of input address positions of the address decoder.

Joint realization of the parity trees of XOR gates for regenerating the input address, and of the parity tree of half adders is shown in FIG. 4 and will be explained in more detail below.

The H matrix of the extended Hamming code contemplated here is $$H = \begin{pmatrix} 1 & 0 & 1 & 0 & 1 & 0 & 1 \\ 0 & 1 & 1 & 0 & 0 & 1 & 1 \\ 0 & 0 & 0 & 1 & 1 & 1 & 1 \\ 1 & 1 & 1 & 1 & 1 & 1 & 1 \end{pmatrix} \quad (1)$$

The column vectors of the H matrix are the binary representations of numbers 1, 2, 3, 4, 5, 6, 7 which are extended by a value of 1 in the last line. In order to be able to regenerate the input address in a simple manner, the arrangement of the columns in the order indicated in (1) is important.

In accordance with the first line of the H matrix, outputs $y_1$, $y_3$, $y_5$ and $y_7$ are XORed to form $x_1'$.

In accordance with the second line of the H matrix, outputs $y_2$, $y_3$, $y_6$ and $y_7$ are XORed to form $x_2'$.

In accordance with the third line of the H matrix, outputs $y_4$, $y_5$, $y_6$ and $y_7$ are XORed to form $x_3'$.

The last line of the H matrix describes the XORing of all outputs $y_1, \ldots, y_7$ of the decoder, and thus the overall parity P.

The H' matrix of regeneration device 110 corresponds to the H matrix from (1) without the last line for overall parity. Output $y_0$ is not included in any of the XOR trees. This simplifies the hardware for the regeneration of the input address. Then the hardware will simply consist of the implementation of the H' matrix of the Hamming code with the column number $p=2^m-1$, her with m=3 and p=7.

Accordingly, regeneration device 110 and/or the first error detection device may also be referred to as a means for Hamming encoding.

Figure 2:
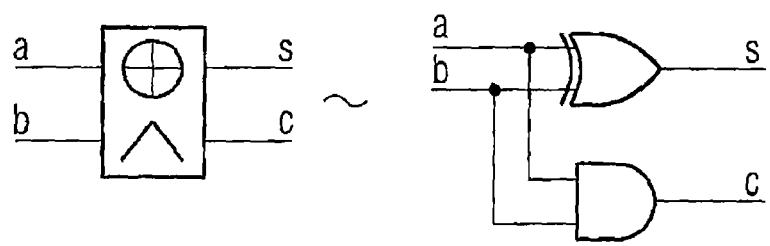
FIG. 2 shows a block diagram of a half adder, and a realization at gate level.

The half adder cells of the tree of the half adders consist of a two-inputs XOR gate and a two-inputs AND gate, as is depicted in FIG. 2. The two inputs of the XOR gate are applied to the two inputs of the AND gate in parallel. The AND gate outputs a 1 when the value of 1 is applied to both its inputs.

The XOR gates of the half adder cells are linked into a complete tree outputting, at its output, the parity and/or overall parity P, of inputs $y_1, y_2, \ldots, y_7$. The outputs of all AND gates are combined within an OR gate 376, to which the negated overall parity $\overline{P}$ may also be applied. In addition, output $y_0$ is applied to OR gate 376.

As has already been set forth above, the overall parity here also detects the faulty output $0, 0, \ldots, 0$, in particular. Thus, the tree of half adder cells detects all non-code words of the 1-out-of-n code as faulty.

Accordingly, signal processing device 160 and/or the second error detection device 160 may also be referred to as a 1-out-of-n error detection.

The overall parity is not necessary when contemplating the overall circuit, as the faulty output $0, 0, \ldots, 0$ may also be detected by the regeneration of the input address.

The two error detection circuits and/or error detection devices jointly detect all errors at the output of the address decoder.

The mode of operation and, in particular, the error detection of the circuit will be explained below by means of examples.

In the following, it shall be assumed that input $x_1, x_2, x_3 = 0, 0, 0$ is not input into the decoder. This precondition considerably simplifies the circuit for regenerating the input symbols, or input addresses.

It shall also be assumed, as an example, that $x_1, x_2, x_3 = 1,1,1$ has been input into the decoder. In the error-free case, decoder 302 will then output the code word (0,0,0,0,0,0,0,1), so that $y_7=1$, $y_6=y_5=\ldots=y_1=y_0=0$. By means of the parity trees for realizing the H matrix in FIG. 3, this code word is transformed to the regenerated input $x_1', x_2', x_3' = 1,1,1$.

$x_1', x_2', x_3' = 1,1,1$ regenerates $x_1, x_2, x_3 = 1,1,1$ correctly. Parity signal P=1. At none of the XOR gates of the tree of half adder elements will the two inputs be 1 simultaneously, so that all AND gates of the half adders output the value of 0. The OR gate outputs the value of 0.

If decoder 302 outputs the output vector and/or the output address 0,0,0,0,0,1,0 instead of the correct output 0,0,0,0,0,0,1, vector $x_1', x_2', x_3' = 0,1,1$ will be regenerated by the parity trees for realizing the H matrix, so that the error will be detected by comparing $x_1, x_2, x_3 = 1,1,1$ with $x_1', x_2', x_3' = 0,1,1$. Parity output P continues to equal 1, and a value of 0 is output at the output of the OR gate. By analogy, all errors which corrupt a 1-out-of-n code word into a different 1-out-of-n code word will be detected.

Any errors resulting in at least two ones at the output of the decoder will be detected by the output value 1 of the OR gate. In addition, in many cases, but after all not in all cases, they will be detected by the regeneration of the input symbols.

Reference shall be made below to the output of the non-code word 1,0,1,0,0,0,0. One may see from FIG. 3 that the XOR gates of the half adder elements 364 and 366 output a 1 in each case. Thereby, the AND gate of the half adder element 370 outputs the value of 1 which leads to an output 1 of the OR element 376, the output indicating an error. An output of decoder 302 with an even number of ones is also detected via parity output P. In the case contemplated, the overall parity 0 results, which also leads to an output 1 at the output of OR gate 376. It shall be assumed, in the following, that the correct output 0,0,0,0,0,01 has been corrupted into 1,1,0,1,0,0,0,0. This faulty output is regenerated to $x_1', x_2', x_3' = x_1, x_2, x_3 = 1, 1, 1$, just like the correct output. Parity output P also indicates the correct value P=1. However, two ones are applied to the input of half adder element 364, so that the AND gate of this elements outputs a 1 which leads to a value of 1 at the output of OR gate 376, the output indicating an error. If the value of 1 is output at output $y_0$, this error will be detected at the output of OR gate 376. If vector 0,0,0,0,0,0,0 is output at the output of decoder 302, the overall parity will be 0, and the OR gate 376 will output the value of 1, which indicates the error. This error will also be detected by regenerating the input symbols.

If the input 0, 0, 0 is input into the decoder even though it is not admissible as an input, $y_0=1$ will apply, and the OR gate 376 will output the value of 1, which indicates an error.

FIG. 4 shows a joint implementation of the parity trees which realize the H matrix, or the H' matrix, and of the tree of the half adder elements, wherein some XOR gates of both trees are shared. Just like FIG. 3, FIG. 4 shows an address decoder 302; in FIG. 4, however, the regeneration device of the first error detection device and the signal generation device being integrated into a circuit, unlike in FIG. 3, and the XOR gates of half adders 464, 466, 468, 470 and 472 are also employed for the parity trees for regenerating the input address and/or for forming the regenerated address positions $x_1'$, $x_2'$ and $x_3'$. Regenerated address X' is passed on to a comparison device which is not depicted.

Even though the invention has been explained above in detail using an example of m=3 input address positions and p=7 output address positions, the invention is not limited to this combination but is also possible with other, particularly larger numbers of positions. By way of example, FIG. 5 shows, for m=3 to 8 input address positions and/or regenerated address positions, the maximum number p of the output address positions for an inventive error detection. p is calculated to be $p=2^m-1$ and/or, with $n=2^m$, $m=n-1$.

The parity trees for regenerated address positions $x_1', \ldots, x_m'$ may be derived via the Hamming matrix H', as has been set forth above, the Hamming matrix H' in the columns comprising the binary representations of the FIG. 1, ..., p.

The regeneration device may be configured to employ one output address position for generating at least two different regenerated address positions.

The regeneration circuit may further be configured to receive a plurality of address positions of the output address and to generate the regenerated address with a plurality of regenerated address positions, the regeneration circuit comprising a plurality of XOR gates, each of the XOR gates comprising a plurality of inputs and one output, it being possible for each output of the XOR gates of the last stage to be associated with a regenerated address position, and the inputs of the XOR gates receiving different combinations of the output address positions, respectively.

In addition, the regeneration device may be configured to select the combinations of the output address positions in accordance with a predetermined matrix, as has been described above, the matrix comprising p columns, p equaling the number of output address positions, and each column being associated with an output address position, the values of 1 to p being stored, in a binary form, with m positions in the columns of the matrix, m equaling the number of regenerated address positions; the regeneration device being operative to select m combinations from the matrix, each combination corresponding to a line of the matrix, those output address positions at whose column position the matrix exhibits an entry with a first logic level, for example 1 being applied to the inputs of an XOR gate.

In further embodiments of the error detection device, wherein the output address includes a plurality of address positions, a valid output address exhibiting, at an address position, a first value having a first logic level, and, at all other address positions, a second value having a second logic level, the signal generation device is operative to generate the error-indicating signal if more than one address position of the output address exhibits the first value, or if no address position of the output address exhibits the first value.

Further embodiments of the error detection device have a signal generation device with a plurality of linking gates of a first stage, with a plurality of linking gates of a second stage, with a linking gate of a third stage, and with an output gate, the linking gates of the first stage receiving two output address positions, respectively, and generating a first and second output signal, respectively, on the basis of various linking operations, the linking gates of the second stage receiving first output signals of the linking gates of the first stage and generating a first and a second output signal, respectively, on the basis of various linking operations, the linking gate of the third stage receiving first output signals of the linking gates of the second stage and generating a first and a second output signal on the basis of various linking operations, and the output gate receiving the second output signals of the linking gates of the first stage, the second output signal of the linking gates of the second stage, and the first output signal and the second output signal of the linking gates of the third stage, and generating the error indication signal at the output. The linking gate may be a half adder, the output gate may be an OR gate, and the first output signal of the linking gate of the third stage may be applied to an output of the output gate in an inverted manner.

For input addresses having more than three address positions, the signal processing device comprises m>3 stages, the fundamental structure and signal processing of the signals at the half adders and at the OR gate corresponding to the example for m=3 in FIGS. 3 and 4.

A further embodiment of the error detection device comprises an evaluation device configured to receive the signals from the signal generation device and the comparison device and to generate and provide an error signal if either the signal generation device or the comparison device generate the error-generating signal.

What follows are further contemplations on error detection. The parity trees which implement the H matrix H and/or H' implement the syndrome equations of a Hamming code with m control bits and $2^m-1-m$ information bits. There is exactly one code word, respectively, of the contemplated code with $2^m-1$ bits for any predefined $2^m-1-m$ information bits. All code words are mapped to the syndrome of 0, see signal 142 of FIGS. 3 and 4. An error which is a code word thus cannot be detected by the regeneration of the inputs. Of a total of $2^{2^m-1}$ possible errors, $2^{2^m-1-m}$ errors are code words which are not detected as faulty by the regeneration of the input symbols. Thus, a proportion of $2^{-m}$ errors are not detected as faulty by the regeneration of the input symbols ($m \approx \log_2(n)$). On the other hand, the tree of half adder elements fails to detect those very errors which corrupt an expected 1-out-of-n code word into a different 1-out-of-n code word. For each of the n possible 1-out-of-n outputs, these are precisely (n−1) 2-bits errors. It is these very errors that lead to a wrong, but formally correct, command.

The combination of both error detection device detects all errors. Since the two error detection circuits are jointly implementable, the overhead is essentially given by the additional linking gates, i.e. the n−2 AND gates (or NAND gates) and the additional output gate, or OR element, (NAND element) with n inputs.

The expenditure necessitated for the error detection for the address decoder is relatively high, however it may be reduced with specific cells, e.g. half adder cells, multi-input XOR cells.

What will be dealt with below is the error detection for the combinatorial circuit for modifying the parameters of the instructions. If the sign extension unit and the combinatorial circuit for adding zeros are doubled along with the ALU, no specific error detection circuit will be necessary for this unit.

In a preferred embodiment, the ALU is doubled. If a potential sign extension unit is also doubled, the sign extension units which will then have been doubled may be formally regarded as included in the respective ALUs. If this unit is realized only once, a specific error detection circuit will be necessary for the sign extension unit.

In other words, if they are not doubled and realized as a combinatorial circuit, they will preferably be protected by a linear code. The inputs of the combinatorial circuit may be protected in that, e.g., the inputs of the circuit are tapped prior to being checked for the cache, and the inputs for generating the code bits are tapped at the output of the circuit for comparison with the code bits, generated from the output signals, after the check for the cache. Due to the relatively small word width, photosensitive memory cells may also be employed. The following shall be noted in terms of doubling the ALU. If the control signal sequences of the instructions are generated, within the instruction decoder realized as a dual-port ROM, also referred to as a two-port ROM, to be doubled in a temporally offset manner, the control signal sequences which have been doubled in a temporally offset manner may be used for the two doubled ALUs which are now operating in a temporally offset manner.

This obviates the comparison of the two temporally offset control signal sequences, since they are compared by the ALU results.

If the register field has not been, then the register field will be used for both ALUs, directly and in a delayed manner.

Then, error detection is performed with the same probability with which errors within the ALU are detected. In the event of doubling and comparing a 16-bits ALU, this is an error detection probability of $(1-2^{-16})$. If the error detection probability is improved, the error detection probability for the instruction decoder will automatically be improved.

In summary, one may state that three variants are possible for error detection within an instruction decoder. The first variant involves error detection for the individual modules of the instruction decoder using a dual-port ROM, or two-port ROM, and the regeneration of input signals of the address decoder, as has been explained above in detail. In the second variant, control words accumulated into signatures are compared for each instruction. The third variant employs essentially photosensitive memory cells and simple codes, an alternative which is not set forth in detail here.

Due to the small bit width and given the restriction of not being able to spend any sum on protective measures, the protection possibilities for address decoding necessitate a method enabling the best protection of the addresses possible at the lowest expenditure possible. This protection is guaranteed by a method generating a calculation of the original input address from the "one-hot" address, i.e. from the output address which is actually present at the memory field after the 1-out-of-n decoding, and/or regenerating an input address on the basis of the output address of the 1-out-of-n address decoder. This circuit is depicted by way of example in FIGS. 1, 3, and 4. Every induced 1-bit error and all multi-bit errors slipped into the address decoder will be detected. This allows safeguarding the addresses generated.

If the instruction decoder is protected individually for its parts, as has been described above, there will be a very high level of protection for the ROM regarding transient errors, and for the address decoder. If the error detection device is implemented such that it comprises both the first error detection device consisting of the regeneration device and the comparison device, and the second error detection device consisting of the signal processing device, all transient errors will be detected.

The safeguarding of the inputs of the instruction decoder also depends on the implementation of the cache and of the instruction decoder. For better safeguarding of the register contents, additional photosensitive elements may be employed, for example, at few localized positions, since sometimes individual bytes (of a width of only 8 bits) are input.

Depending on the circumstances, the inventive method may be implemented in hardware or in software. The implementation may be done on a digital storage medium, particularly a disk or a CD with electronically readable control signals, which may cooperate with a programmable computer system so that the method is executed. In general, the invention thus also consists in a computer program product with a program code stored on a machine-readable carrier for performing the inventive method when the computer program product runs on a computer. In other words, the invention may thus be realized as a computer program with a program code for performing the method when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An error detection device for an address decoder converting an input address to an associated output address out of a plurality of valid output addresses using a 1-out-of-n decoder, the error detection device comprising:

a regenerator configured to generate a regenerated address on the basis of the output address from the 1-out-of-n decoder, the regenerated address equaling the input address if the conversion of the input address to the associated output address occurs without any faults, and the regenerated address not equaling the input address if the conversion of the input address generates an output address, out of the plurality of valid output addresses, which does not equal the associated output address; and a comparer configured to receive the input address and the regenerated address and to output a signal, on the basis of a comparison of the input address and the regenerated address, which indicates an error in the conversion of the input address to the output address if the input address and the regenerated address do not match, and which indicates an error-free conversion of the input address to the output address if the input address equals the regenerated address.

2. The error detection device as claimed in claim 1, wherein the output address comprises a plurality of address locations, the regenerated address comprises a plurality of regenerated address locations, and wherein the regenerator is also configured to use an output address location for generating at least two different regenerated address locations.

3. The error detection device as claimed in claim 1, wherein the regenerator is configured to receive a plurality of address locations of the output address, and to generate the regenerated address with a plurality of regenerated address locations, the regenerator comprising a plurality of XOR gates, each of the XOR gates comprising a plurality of inputs and one output, each output of the XOR gates being associated with a regenerated address location, and the inputs of the XOR gates receiving different combinations, respectively, of the output address locations.

4. The error detection device as claimed in claim 3, wherein the regenerator is also configured to select the combinations of the output address locations in accordance, with a predetermined matrix, the matrix having p columns, p equaling the number of the output address locations, and each column being associated with an output address location, the values 1 to p being stored, in the columns of the matrix, in a binary form with m locations, m equaling the number of regenerated address locations, and wherein the regenerator is also configured to select, from the matrix, m combinations, each combination corresponding to a line of the matrix, those output addresses at whose column positions the matrix has an entry with a first logical level being applied to the inputs of an XOR gate.

5. An error detection device for an address decoder converting an input address to an associated output address out of a plurality of valid output addresses using a 1-out-of-n decoder, the error detection device comprising:
a signal generator configured to output, on the basis of the output address from the 1-out-of-n decoder, a signal which indicates an error in the conversion of the input address to the output address if the conversion of the input address generates an output address which does not originate from the plurality of valid output addresses, and indicates an error-free conversion of the input address to the output address if the conversion of the input address generates an output address from the plurality of valid addresses.

6. The error detection device as claimed in claim 5, wherein the output address comprises a plurality of address locations, a valid output address having, at an address location, a first value having a first logical level and, at all further address locations, a second value having a second logical level, the signal generator being operative to generate the error-indicating signal if
more than one address location of the output address exhibits the first value, or
no address location of the output address exhibits the first value.

7. The error detection device as claimed in claim 6, wherein the signal generator comprises a plurality of linking gates of a first stage, a plurality of linking gates of a second stage, a linking gate of a third stage, and an output gate,
the linking gates of the first stage being configured to receive two output address locations, respectively, and generate a first output signal and a second output signal, respectively, on the basis of different linking operations,
the linking gates of the second stage being configured to receive the first output signals of the linking gates of the first stage, and generate a first output signal and a second output signal, respectively, on the basis of different linking operations,
the linking gate of the third stage being configured to receive the first output signals of the linking gates of the second stage, and generate a first output signal and a second output signal on the basis of different linking operations; and
the output gate being configured to receive the second output signals of the linking gates of the first stage, the second output signals of the linking gates of the second stage, and the first output signal and the second output signal of the linking gate of the third stage, and generating the error-indicating signal at the output.

8. The error detection device as claimed in claim 7, wherein the linking gate is a half adder, the output gate is an OR gate, and the first output signal of the linking gate of the third stage is applied, in an inverted manner, to an input of the output gate.

9. The error detection device as claimed in claim 5, further comprising:
a regenerator configured to generate a regenerated address on the basis of the output address from the 1-out-of-n decoder, the regenerated address equaling the input address if the conversion of the input address to the associated output address occurs without any faults, and the regenerated address not equaling the input address if the conversion of the input address generates an output address, out of the plurality of valid output addresses, which does not equal the associated output address; and
a comparer configured to receive the input address and the regenerated address and to output a signal, on the basis of a comparison of the input address and the regenerated address, which indicates an error in the conversion of the input address to the output address if the input address and the regenerated address do not match, and which indicates an error-free conversion of the input address to the output address if the input address equals the regenerated address.

10. The error detection device as claimed in claim 9, further comprising an evaluator configured to receive the signals from the signal generator and the comparer, and to generate and provide an error signal if either the signal generator or the comparer generates the error-generating signal.

11. An address decoder for converting an input address to an associated output address from a plurality of valid output addresses using a 1-out-of-n decoder, the address decoder comprising an error detection device, the error detection device comprising:
a regenerator configured to generate a regenerated address on the basis of the output address from the 1-out-of-n decoder, the regenerated address equaling the input address if the conversion of the input address to the associated output address occurs without any faults, and the regenerated address not equaling the input address if the conversion of the input address generates an output address, out of the plurality of valid output addresses, which does not equal the associated output address; and
a comparer configured to receive the input address and the regenerated address and to output a signal, on the basis of a comparison of the input address and the regenerated address, which indicates an error in the conversion of the input address to the output address if the input address and the regenerated address do not match, and which indicates an error-free conversion of the input address to the output address if the input address equals the regenerated address.

12. An address decoder for converting an input address to an associated output address from a plurality of valid output addresses using a 1-out-of-n decoder, the an address decoder comprising an error detection device, the error detection device comprising:
a signal generator configured to output, on the basis of the output address from the 1-out-of-n decoder, a signal which indicates an error in the conversion of the input address to the output address if the conversion of the input address generates an output address which does not originate from the plurality of valid output addresses, and indicates an error-free conversion of the input address to the output address if the conversion of the input address generates an output address from the plurality of valid addresses.

13. A method for error detection for an address decoder converting an input address to an associated output address out of a plurality of valid output addresses using a 1-out-of-n decoder, the method for error detection comprising:
generating, by an error detection device of an address decoder, a regenerated address on the basis of the output address from the 1-out-of-n decoder, the regenerated address equaling the input address if the conversion of the input address to the associated output address occurs without any faults, and the regenerated address not equaling the input address if the conversion of the input address generates an output address, out of the plurality of valid output addresses, which does not equal the associated output address;
receiving, by the error detection device of the address decoder, the input address and the regenerated address; and comparing, by the error detection device of the address decoder, the input address and the regenerated address to output a signal, on the basis of a comparison of the input address and the regenerated address, which indicates an error in the conversion of the input address to the output address if the input address and the regenerated address do not match, and which indicates an error-free conversion of the input address to the output address if the input address equals the regenerated address.

14. A method for error detection for an address decoder converting an input address to an associated output address out of a plurality of valid output addresses using a 1-out-of-n decoder, the method for error detection comprising:

generating, by an error detection device of an address decoder, a signal, on the basis of the output address from the 1-out-of-n decoder, which indicates an error in the conversion of the input address to the output address if the conversion of the input address generates an output address which does not originate from the plurality of valid output addresses, and indicates an error-free conversion of the input address to the output address if the conversion of the input address generates an output address from the plurality of valid addresses.

15. The method for error detection as claimed in claim 14, further comprising:

generating, by the error detection device of the address decoder, a regenerated address on the basis of the output address from the 1-out-of-n decoder, the regenerated address equaling the input address if the conversion of the input address to the associated output address occurs without any faults, and the regenerated address not equaling the input address if the conversion of the input address generates an output address, out of the plurality of valid output addresses, which does not equal the associated output address;

receiving, by the error detection device of the address decoder, the input address and the regenerated address; and comparing, by the error detection device of the address decoder, the input address and the regenerated address to output a signal, on the basis of a comparison of the input address and the regenerated address, which indicates an error in the conversion of the input address to the output address if the input address and the regenerated address do not match, and which indicates an error-free conversion of the input address to the output address if the input address equals the regenerated address.

16. A computer program product comprising a program code stored on a machine readable carrier for performing, when running on a computer, a method for error detection for an address decoder converting an input address to an associated output address out of a plurality of valid output addresses using a 1-out-of-n decoder, the method for error detection comprising:

generating a regenerated address on the basis of the output address from the 1-out-of-n decoder, the regenerated address equaling the input address if the conversion of the input address to the associated output address occurs without any faults, and the regenerated address not equaling the input address if the conversion of the input address generates an output address, out of the plurality of valid output addresses, which does not equal the associated output address;

receiving the input address and the regenerated address; and comparing the input address and the regenerated address to output a signal, on the basis of a comparison of the input address and the regenerated address, which indicates an error in the conversion of the input address to the output address if the input address and the regenerated address do not match, and which indicates an error-free conversion of the input address to the output address if the input address equals the regenerated address.

17. A computer program product comprising a program code stored on a machine readable carrier for performing, when running on a computer, a method for error detection for an address decoder converting an input address to an associated output address out of a plurality of valid output addresses using a 1-out-of-n decoder, the method for error detection comprising:

generating a signal, on the basis of the output address from the 1-out-of-n decoder, which indicates an error in the conversion of the input address to the output address if the conversion of the input address generates an output address which does not originate from the plurality of valid output addresses, and indicates an error-free conversion of the input address to the output address if the conversion of the input address generates an output address from the plurality of valid addresses.

* * * * *